(12) United States Patent  
Utukuri et al.

(10) Patent No.: US 8,405,824 B2
(45) Date of Patent: Mar. 26, 2013

(54) SENSORS, SYSTEMS AND METHODS FOR POSITION SENSING

(75) Inventors: Avanindra Utukuri, Mississauga (CA); Jonathan Clarke, North York (CA)

(73) Assignee: Baanto International Ltd., Mississauga (CA)

( * ) Notice: Subject to any disclaimer, the term of this patent is extended or adjusted under 35 U.S.C. 154(b) by 0 days.

(21) Appl. No.: 13/051,898

(22) Filed: Mar. 18, 2011

(65) Prior Publication Data

US 2011/0170088 A1    Jul. 14, 2011

Related U.S. Application Data

(63) Continuation of application No. PCT/CA2009/001326, filed on Sep. 21, 2009.

(60) Provisional application No. 61/098,749, filed on Sep. 20, 2008.

(51) Int. Cl.
*G01B 11/26* (2006.01)

(52) U.S. Cl. ...................................................... 356/138

(58) Field of Classification Search .................. None
See application file for complete search history.

(56) References Cited

U.S. PATENT DOCUMENTS

| 3,866,229 | A  | * | 2/1975 | Hammack ...................... 342/451 |
| 4,857,721 | A  | * | 8/1989 | Dunavan et al. ............. 250/206.1 |
| 6,242,754 | B1 | * | 6/2001 | Shiraishi ....................... 250/548 |

* cited by examiner

*Primary Examiner* — Tu Nguyen

(57) ABSTRACT

Various systems and methods for estimating the position of a radiation source in three-dimensional space, together with sensors for use in such systems are described. In some embodiments, the systems include a plurality of radiation sensors. The three-dimensional position of the radiation source is estimated relative to each sensor using an aperture that casts shadows on a radiation detector as a function of the incident angle of the incoming radiation. In some embodiments, the ratio of a reference radiation intensity to a measured radiation intensity is used to estimate direction of the radiation source relative to the sensor. When the angular position of the radiation source is estimated relative to two sensors, the position of the radiation source in three dimensions can be triangulated based on the known relative positions of the two sensors.

14 Claims, 8 Drawing Sheets

SENSORS, SYSTEMS AND METHODS FOR POSITION SENSING

TECHNICAL FIELD

Embodiments described herein relate generally to apparatus and accompanying methods for detecting the position of a radiation source in three dimensions using angular position sensors and triangulation methods.

BACKGROUND

Numerous industrial, commercial, scientific, gaming and other applications require sensing of the position of an object in two and three dimensions. A variety of approaches exist for estimating the position of an object. However, these approaches tend to have limited accuracy or a high cost, or both.

There is a need for apparatus, systems and method for detecting the position of an object with increased accuracy compared to known methods.

SUMMARY OF EMBODIMENTS

A first aspect of the invention provides a sensor for estimating the angular direction of a radiation source relative to the sensor. The sensor comprises: a reference radiation detector for providing a reference radiation intensity signal corresponding to an intensity of radiation incident on the reference radiation detector; a first direction radiation detector for providing a first direction radiation intensity signal corresponding to an intensity of radiation incident on the first direction radiation detector; a second direction radiation detector for providing a first direction radiation intensity signal corresponding to an intensity of radiation incident on the second direction radiation detector; a radiation stop for partially blocking radiation from reaching the first and second direction radiation detectors; and a processor coupled to the reference radiation detector and to the first and second direction radiation detectors for providing for providing first and second incident angles wherein the first incident angle corresponds to the first direction radiation intensity signal and the reference radiation intensity signal and the second incident angle corresponds to the second direction radiation intensity signal and the reference radiation intensity signal.

Another aspect provides a sensor for estimating the angular direction of a radiation source relative to the sensor. The sensor comprises: a reference radiation detector for providing a reference radiation intensity signal corresponding to an intensity of radiation incident on the reference radiation detector; a first direction radiation detector for providing a first direction radiation intensity signal corresponding to an intensity of radiation incident on the first direction radiation detector; a second direction radiation detector for providing a second direction radiation intensity signal corresponding to an intensity of radiation incident on the second direction radiation detector; a radiation stop for partially blocking radiation from reaching the first and second direction radiation detectors; and a processor coupled to the reference radiation detector and to the first and second direction radiation detectors for providing for providing first and second incident angles wherein the first incident angle corresponds to the first direction radiation intensity signal and the reference radiation intensity signal and the second incident angle corresponds to the second direction radiation intensity signal and the reference radiation intensity signal.

Another aspect provides a sensor for estimating the angular direction of a radiation source relative to the sensor, the sensor comprising: a reference radiation detector for providing a reference radiation intensity signal corresponding to an intensity of radiation incident on the reference radiation detector; a pair of first direction radiation detector for providing a pair of first direction radiation intensity signal corresponding to an intensity of radiation incident on the first direction radiation detector; a pair of second direction radiation detector for providing a pair second direction radiation intensity signal corresponding to an intensity of radiation incident on the second direction radiation detector; a radiation stop for partially blocking radiation from reaching the first and second direction radiation detectors; and a processor coupled to the reference radiation detector and to the first and second direction radiation detectors for providing for providing first and second incident angles wherein the first incident angle corresponds to the first direction radiation intensity signals and the reference radiation intensity signal and the second incident angle corresponds to the second direction radiation intensity signals and the reference radiation intensity signal.

Another aspect provides a sensor for estimating the angular direction of a radiation source relative to the sensor, the sensor comprising: a reference radiation detector for providing a reference radiation intensity signal corresponding to an intensity of radiation incident on the reference radiation detector; a pair of directional radiation detector for providing a pair of directional radiation intensity signal corresponding to an intensity of radiation incident on the first direction radiation detector; a radiation stop for partially blocking radiation from reaching the first and second direction radiation detectors; and a processor coupled to the reference radiation detector and to the directional radiation detectors for providing for providing an incident angle, wherein the incident angle corresponds to the directional radiation intensity signals and the reference radiation intensity signal.

Another aspect provides a sensor for estimating the angular direction of a radiation source relative to the sensor. The sensor comprises: a pixel array detector having an array of a pixels sensitive to radiation; an aperture plate having an aperture, wherein the aperture plate is arranged relative to the pixel array detector to partially blocking radiation from reaching the pixel array detector; a processor coupled to the pixel array detector to receive radiation intensity information relating to the intensity of radiation incident on the pixels of the pixel array detector, wherein the processor is adapted to provide first and second incident angles, wherein the first incident angle is corresponds to the position of one or more pixels having a relatively high level of incident radiation in a first direction and the second incident angle corresponds to the position of one or more pixels have a relatively high level of incident radiation in a second direction.

Another aspect provides a system for estimating the position of a radiation source in three dimensional space. The system comprises: a first radiation sensor for receiving radiation from the radiation source and for providing a first incident angle pair corresponding to the direction of the radiation source relative to the first radiation source; a second radiation sensor for receiving radiation from the radiation source and for providing a second incident angle pair corresponding the direction of the radiation source relative to the second radiation source; and a processor for calculating the estimated position of the radiation source based on the first and second incident angle pairs.

In some embodiments, the processor is adapted to calculate the estimated position of the radiation source by determining a point of intersection between a first line defined by the first incident angle pair and the position of the first radiation sensor and a second line defined by the second incident angle pair and the second radiation sensor.

In some embodiments, the processor is adapted to calculate the estimated position of the radiation source by identifying a line segment between the closest points between a first line defined by the first incident angle pair and the position of the first radiation sensor and a second line defined by the second incident angle pair and the second radiation sensor.

In some embodiments, the processor is adapted to calculate the estimate position of the radiation source by bisecting the line segment.

In some embodiments, the first and second sensors are mounted in a fixed relationship to one another.

In some embodiments, the first and second sensors may be independently positioned relative to one another.

Another aspect provides a method of estimating the position of a radiation source. The method comprises: positioning first and second sensors in a three dimensional space, wherein the first second sensor are separated by a sensor spacing distance; calculating a first line corresponding to the position of the first sensor and the position of the radiation source; calculating a second line corresponding to the position of the second sensor and the position of the radiation source; and calculating an estimated position of the radiation source based on the first and second lines.

In some embodiments, the method includes estimating the position of the radiation source by identifying a point of intersection between the first and second lines.

In some embodiments, the method includes estimating the position of the radiation source by identifying a line segment between the closest points on the first and second lines.

In some embodiments, the method includes estimating the position of the radiation source by bisecting the line segment.

These and other aspect of the present invention are further described below.

BRIEF DESCRIPTION OF THE DRAWINGS

Embodiments are described in further detail below, by way of example, with reference to the accompanying drawings, in which:

FIGS. 1b and 1c are side views of the sensor of FIG. 1a;

FIGS. 2b and 2c are side views of the sensor of FIG. 2a;

The figures are illustrative only and are not drawn to scale.

DETAILED DESCRIPTION OF EXAMPLE EMBODIMENTS

Example embodiments described herein provide details relating to optical sensor systems and methods for determining the position of a radiation source relative to the position of one or more sensors. The radiating source may radiate in the visible light spectrum, but it may also radiate in other light spectrums, such as the ultraviolet or infrared light spectrums. The optical sensors comprise solid-state radiation detectors. The radiation source may be an active radiation source that generates radiation, such as a light bulb, LED or other radiation emitting element. The radiation source may be a passive radiation source that reflects radiation from another source or sources. Other implementations and configurations of optical sensors are also possible within the scope of the invention. The embodiments described herein are examples only.

Figure 1A:
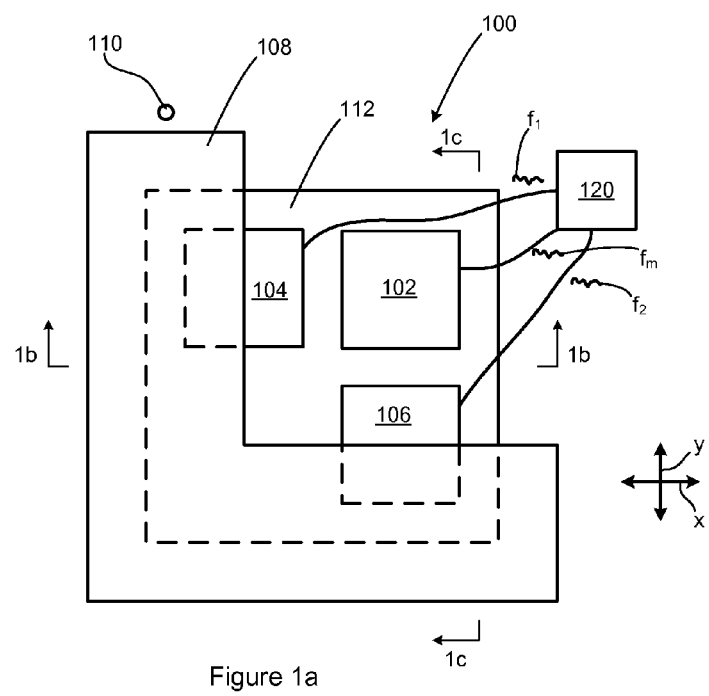
FIG. 1a is a top view of a first sensor according to the invention.
Figure 1B:
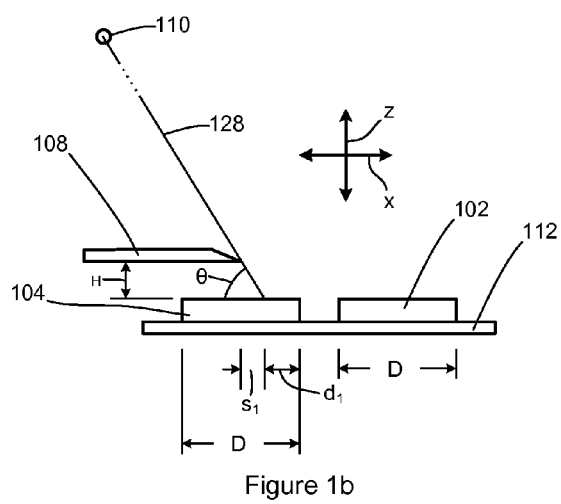
Figure 1C:
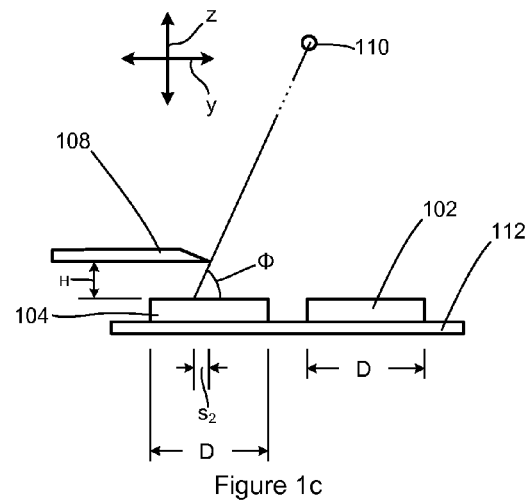

Reference in now made to FIGS. 1a-1c, which illustrate a first example optical sensor 100. A radiation source 110 is positioned relative to sensor 100 such that radiation from the radiation source 110 is incident upon the sensor 100.

Sensor 100 comprises reference radiation detector 102, first direction radiation detector 104, second direction radiation detector 106, aperture plate 108, a mounting substrate 112 and a processor 120.

Mounting substrate 112 is substantially parallel to an x-y plane. The reference detector 102, first direction detector 104 and second direction detector 106 are mounted to the mounting substrate 112. Aperture plate 108 is positioned between the detectors 102-106 and the radiation source 110 in a z-dimension, which is orthogonal to the x-y plane. The aperture plate may also be referred to as a radiation stop or radiation block.

Incoming radiation from radiation source 110 striking sensor 100 impacts upon first direction radiation detector 104 at incident angle $\theta$ relative to the x-axis, and upon second direction radiation detector 106 at incident angle $\phi$ relative to the y-axis. The incident angle pair ($\theta$, $\phi$) defines an angular position of radiation source 110 relative to sensor 100.

Sensor 100 estimates incident angle pair ($\theta$, $\phi$) using reference detector 102 and aperture plate 108 in conjunction with first and second direction radiation detectors 104, 106. Aperture plate 108 is arranged at height H, relative to first and second direction radiation detectors 104, 106. Aperture plate 108 is disposed such that it overlies both first and second positions detectors 104,106. In this example, first and second direction detectors 104,106 are mounted onto mounting substrate 112 such that an edge of aperture plate 108 will approximately align with a centerline of each direction detector 104, 106. Reference detector 102 is mounted onto mounting substrate 112 such that no overlap (in the x or y dimensions) is created between it and aperture plate 108. Mounting substrate 102 may be constructed from any suitable material to support the detectors 102, 104 and 106. Detectors 102, 104 and 106 receive power from a power supply (not shown) and provide electronic signals to processor 120. In some embodiments, mounting substrate 102 may be a semiconductor material such as a printed circuit board (PCB) that includes conductors to couple the detectors to the power supply and processor 120. Optionally, aperture plate 108 may be mounted to the mounting substrate 112 or it may be mounted to another support that holds it in a relatively fixed position relative to detectors 102, 104 and 106.

In this embodiment, reference detector 102, and direction detectors 104,106 are implemented for example as solid-state radiation detectors. Other types of radiation detectors may also be used. Aperture plate 108 is constructed for example out of a suitable opaque material such that incoming radiation from radiation source 110 is substantially absorbed or reflected. Other implementations of sensor 100 are possible.

When incoming radiation from radiation source 110 strikes sensor 100, reference detector 102 will be fully exposed to the incoming radiation. The radiation intensity detected by reference detector 102 forms a reference radiation intensity that is a measure of radiation from radiation source 110 and ambient conditions. In contrast, first and second direction radiation detectors 104, 106 will, through their overlie with aperture plate 108, not be fully exposed to the incoming radiation, and thus will receive an intensity of incoming radiation from radiation source 110 that is in generally not equal to the intensity received by exposed reference detector 102. The different radiation intensities received by positions sensors 104, 106, relative to reference detector 102, can be used to estimate the angular position of radiation source 110, relative to sensor 100.

FIG. 1b shows incident radiation striking first direction radiation detector 104 at an incident angle θ relative to the x-axis. Dimension $s_1$ defines the part of first direction detector 104 that lies in the shadow created by aperture plate 108, from the centerline 114 of the detector. Likewise dimension $d_1$ defines the part of first direction detector 104, relative to centerline 114, that is exposed to incoming radiation from radiation source 110. For positive incident angle θ, the part of position sensor on the other side of centerline 114 is covered in shadow as well. Dimension $s_1$ and $d_1$ are related to width D of first direction detector 102 according to, $$s_1 = \frac{D}{2} - d_1. \quad \text{(Equation 1)}$$

For an incident angle of about 90 degrees, about half of direction detector 102 will be covered in shadow (i.e. $s_1$ is approximately equal to zero) More generally, incident angle θ of radiation source 110 is related to dimension $s_1$ and height H according to:

$$\tan\theta = \frac{H}{s_1}. \quad \text{(Equation 2)}$$

Reference detector 102 and direction detector 104 are coupled to processor 120. Both reference detector 102 and direction detector 104 provide radiation intensity signals f that are generally proportional to the intensity of radiation sensed by the respective detector. Processor 120 is adapted to use these radiation intensity signals to estimate the position of radiation source 110 relative to the sensor 100.

Reference detector 102 provides a baseline intensity signal $f_m$ against which other radiation intensity levels may be compared. For example, detector 104, which through its overlie with aperture plate 108 is only partially exposed to radiation source 110. Ray 128 illustrates the ray of radiation at the boundary between the illuminated and shadowed regions of detector 104. Ray 128 is illustrated partly in a broken line to indicate that typically radiation source 110 will be much further from sensor 100 compared to the dimensions of the sensor. Typically, the distance between the radiation source and the sensor will be one or more orders of magnitude greater than the dimensions of the sensors.

Radiation detector 104 provides a radiation intensity signal $f_1$ where generally $f_1 < f_m$. The ratio of radiation intensity $f_1$ relative to reference radiation intensity $f_m$ provides a measure of the ratio between shadow region S and exposed region $d_1$, and is given by, $$\frac{f_1}{f_m} = \alpha\frac{d_1}{D} + \beta, \quad \text{(Equation 3)}$$

where α models a gain factor and β models an offset factor introduced through practical implementations of reference detector 102 and first direction detector 104. In some implementations, the gain factor α may be approximately equal to one, and offset factor β may be approximately equal to zero. In practical implementations, radiation detectors will typically exhibit offsets and non-linearities that may be modeled with these corrective factors. Offset factor β may be used to compensate for ambient radiation.

In various embodiments of the invention, α, β and other corrective factors may be used to model the operating characteristics of the sensors. For example, in sensor 100, detectors 102, 104, 106 are square shaped with width and length D. In other embodiments, the sensors may shaped differently. It is not necessary that sensors 102, 104 and 106 be identical sensors. In various embodiments, different sensors may be used for the reference sensor and the direction sensors and in other embodiments, different direction sensors may be different. Additional corrective factors may be used to scale or otherwise adjust the outputs of the various sensors to allow the direction of the radiation source to be estimated.

Returning to the present exemplary embodiment, combining equations 1, 2 and 3 yields an overall expression for incident angle θ of radiation source 110 and is given by:

$$\theta = \tan^{-1}\left(\frac{H}{\frac{D}{2} - \left(\frac{f_1}{f_m} - \beta\right)\frac{D}{\alpha}}\right). \quad \text{(Equation 4)}$$

Width D and height H are known parameters, while gain factor α and offset factor β may be determined experimentally, if they are used at all. The ratio of $f_1$ to $f_m$ is computed based upon the output signals of reference detector 102 and first direction detector 104.

Referring to FIG. 1c, radiation detector 106 is partially illuminated by radiation source 110 to a distance $S_2$ from its centerline 116. The incident angle φ of radiation source 110 relative to the y-axis, as shown in FIG. 3b, is given by $$\phi = \tan^{-1}\left(\frac{H}{\frac{D}{2} - \left(\frac{f_2}{f_m} - \beta\right)\frac{D}{\alpha}}\right), \quad \text{(Equation 5)}$$

where $f_2$ is the radiation intensity signal provided by second direction detector 106. In this example, incident angle φ is a negative angle.

Incident angle pair (θ, φ) of radiation source 110 is an estimate of the direction of radiation source 110 relative to the sensor 100.

Processor 120 is adapted to receive the radiation intensity signals $f_m$, $f_1$ and $f_2$ and to calculate incident angle pair (θ, φ). Processor 120 may implement the mathematical formulae set out above or may implement corresponding calculations and in some cases may use mathematical techniques that provide an estimate of the results of the formulae. For example, the processor may use look up tables, small angle approximations and other tools to estimate the incident angle pair. In some systems utilizing sensor 100, it may not be necessary to calculate angles θ and φ directly. For example, in some systems, the value of tan(θ) and tan(φ) could be used without calculating the angles themselves. In such cases, the processor may be adapted to calculate these values without then calculating the angles.

In this embodiment, processor 120 is a microprocessor and is adapted to carry out additional functions beyond those described herein. The term "processor" is not limited to any particular type of data processing or calculating element. In various embodiments, the processor may be a microcontroller, a microprocessor, a programmed logic controller such as a floating point gate array or any other suitable device capable of calculation. The processor may operate in conjunction with additional elements such as a power supply, data storage elements, input/output devices and other devices.

Aperture plate 108 may optionally be adapted to reduce non-linearities in the length of the shadow cast by the aperture plate on detectors 104 and 106 when radiation source 110 passes over their respective centerlines 114 and 116. In the present embodiment, the edge of aperture plate 108 is beveled to reduce the effect of the thickness of the aperture plate 108 on the shadow. In other embodiments, the edge of the aperture plate may be rounded. In other embodiments, the aperture plate may additionally or alternatively be made from a thin material to reduce its effect on the shadow. In some embodiments, processor 102 may be adapted to compensate for non-linearities in the position of the shadow cast by the aperture plate. For example, such non-linearities may be modeled into the formulae or look-up tables used by the processor to estimate the incident angle pair (θ, φ).

Figure 2A:
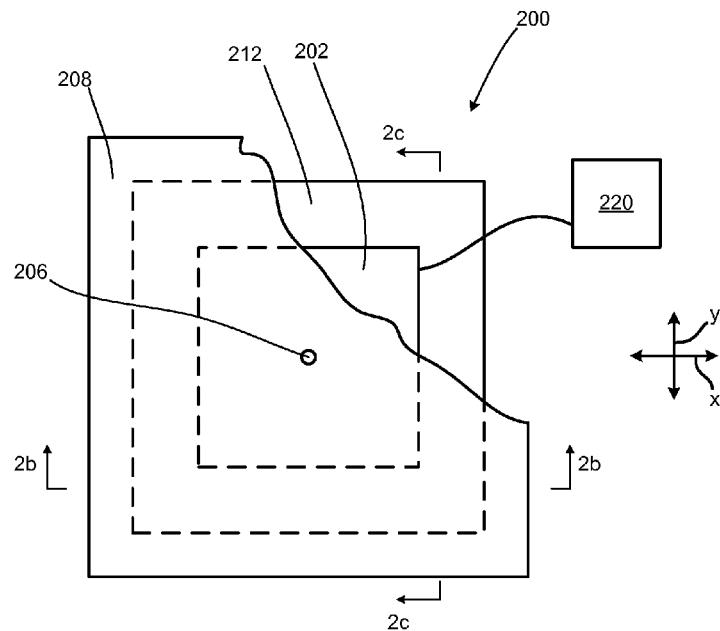
FIG. 2a is a top view of another sensor according to the invention.
Figure 2B:
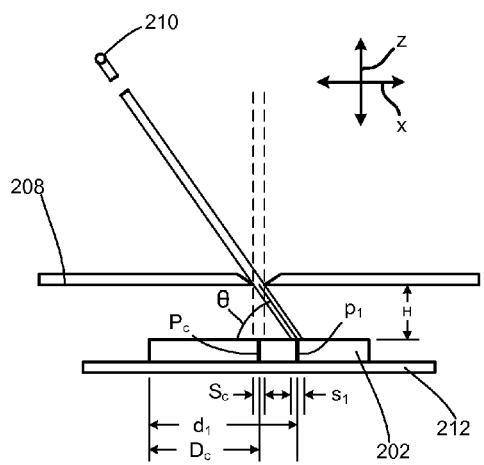
Figure 2C:
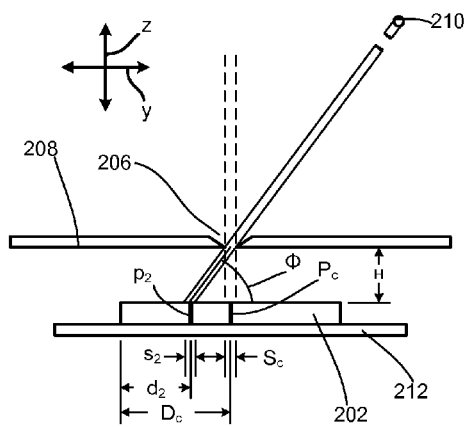

Reference is now made to FIGS. 2a-2c, which illustrate another sensor 200 according to the present invention. Some elements of sensor 200 are similar to elements of sensor 100 and corresponding elements are identified by similar reference numerals. FIG. 2a is a top-view of sensor 200 in an x-y plane. FIG. 2b illustrates a cross-sectional view of sensor 200 in an x-z plane, while FIG. 2c likewise illustrates a cross-sectional view of detector 200 along in a corresponding y-z plane. Detector 200 comprises a pixel-array detector 202, aperture plate 208, mounting substrate 212 and processor 220.

Aperture plate 208 is arranged at height H relative to detector 202 and is positioned so as to overlie with detector 202 in both the x and y directions. Aperture plate 208 plate has an aperture 206, which in this embodiment is centered above detector 202. Aperture plate 208 is generally parallel to detector 202.

A portion of incoming radiation from a radiation source 210 striking detector 200 passes through aperture 206 and impacts upon detector 202 at incident angle θ relative to the x-axis and incident angle φ relative to the y-axis. The incident angle pair (θ, φ) defines an angular position of radiation source 210 relative to detector 200. Pixel-array detector 202 has an array of radiation-sensitive pixels arranged in rows parallel to the x-axis and columns parallel to the y-axis.

In this embodiment, aperture 206 is circular. In other embodiments, the aperture may have another shape. For example, the aperture may be square or rectangular with its edges generally parallel to the x and y axes. The aperture may be square with its edges arranged at an angle (such as a 45 degree) angle to the x and y axes. Other shapes may also be used.

In various embodiments, the pixel-array detector may be a CCD detector, a CMOS detector or other type of radiation sensitive detector. Processor 220 is coupled to the pixel-array detector to periodically determine which pixels are illuminated by radiation source 2 10. This may done in a variety of ways. For example, detector 202 may be adapted to output a data stream indicating the illumination intensity of each of its pixels sequentially; processor 220 may be adapted to query the detector 202 to obtain the illumination intensity for each pixel or for some of the pixels in detector 202.

When incoming radiation from radiation source 210 strikes detector 202, pixels that are exposed to the radiation will have a high illumination intensity while pixels located in the shadow cast by aperture plate 208 will have a low illumination intensity. The positions of pixels with a high illumination intensity may be used to estimate incident angle pair (θ, φ).

FIG. 2b shows incident radiation striking detector 202 at an incident angle θ relative to the x-axis. A range of pixels $s_1$ in a row of the detector 202 is illuminated by the incident radiation through aperture 206. Processor 220 is configured to identify the row of pixels with the widest range of illuminated pixels, which will typically correspond to the diameter of aperture 202 parallel to the x axis. Processor 220 identifies a center x-dimension pixel $p_1$ at or near the center of the range of pixels $s_1$ within the identified row. Pixel $p_1$ is spaced a distance $d_1$ from a reference point 222. Distance $d_1$ may be determined based on the dimensions and arrangement of pixels in detector 202, or a lookup table or other method may be used to determine the distance $d_1$ corresponding to pixel $p_1$. In this example, reference point 222 is at an edge of detector 202. In other embodiments, the reference point may be at another position on the x-y plane of the surface of detector 202.

When radiation source 210 is directly above sensor 200, a range of pixels $S_c$ is illuminated and a center pixel $P_c$ is at or near the center of pixel range $S_c$. Pixel $P_c$ is spaced a distance $D_c$ from reference point 222.

Incident angle θ may be calculated as:

$$\theta = \tan^{-1}\left(\frac{d_1 - D_c}{H}\right).$$

Typically, the values of $D_c$ and H will be recorded in processor 220. Processor 220 repeatedly obtains pixel illumination information from detector 202 and identifies a center pixel $p_1$ and estimates angle θ as radiation source 210 moves relative to sensor 200.

As with processor 120, processor 220 may be adapted to implement the formulae described above or may be implement corresponding calculations or use other methods to estimate angle θ.

Referring to FIG. 2c, radiation source 210 illuminates a range of pixels $s_2$ in a column of pixels parallel to the y-axis of detector 202. A distance $d_2$ is determined based on the center pixel $p_2$ in the range of pixels $s_2$ and incident angle φ is calculated as:

$$\phi = \tan^{-1}\left(\frac{d_2 - D_c}{H}\right).$$

The incident angle pair (θ, φ) provide an estimate of the direction of illumination source 210 relative to the position of sensor 200.

In FIGS. 2a and 2b, radiation from radiation source 210 that passes through aperture 206 is illustrated having parallel edges. Typically, most radiation sources will divergent radiation output. In most embodiments, the divergence of the radiation may be ignored. For example, in many embodiments, the distance between radiation source 210 and aperture plate 208 will substantially exceed the distance between aperture plate 208 and sensor 202 be several orders of magnitude or more and the divergence of the will be negligible in comparison to the dimensions of the radiation reaching sensor 202. In some embodiments, processor 220 may optionally be adapted to compensate for the divergence of the radiation using various geometric and computational operations.

Figure 3:
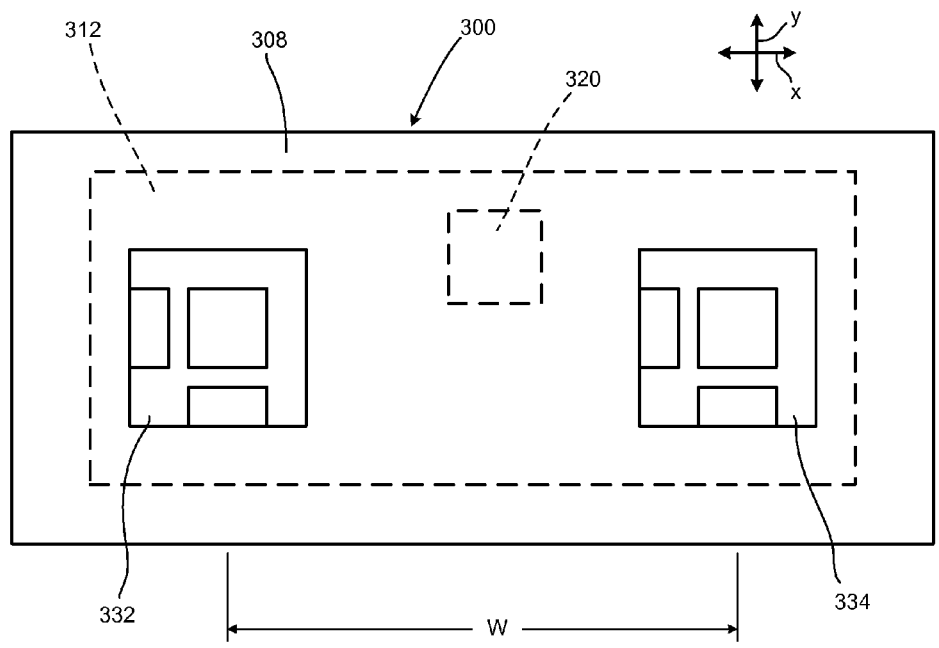
FIG. 3 is a top view of a three-dimensional optical position sensing system.

Reference is now made to FIG. 3, which illustrates a three dimensional optical position sensing system 300. System 300 comprises two sensors 332, 334, each of which is similar to sensor 100 (FIG. 1a). In this embodiment, the two sensors share a common aperture plate 308 which has an aperture formed in it for each of the respective sensors. Sensors 332 and 334 also share a common mounting substrate 312, which holds them in a fixed relationship to one another. Sensors 332 and 334 also share a processor 320 which communicates with each of the detectors in each of the sensors.

Sensors 332, 334 are disposed along an x-axis and are separated by distance W. Processor 320, which is part of each sensor 332,334 determines an angular position for radiation source, in terms of incident angle pair $(\theta, \phi)$. For example, sensor 332 determines an estimated incident angle pair $(\theta, \phi)$, while sensor 334 determines an estimated incident angle pair $(\theta_2, \phi_2)$. Each estimated incident angle pair $(\theta, \phi)$ defines the direction of radiation source 310 relative to the respective sensor 332 or 334.

Figure 4:
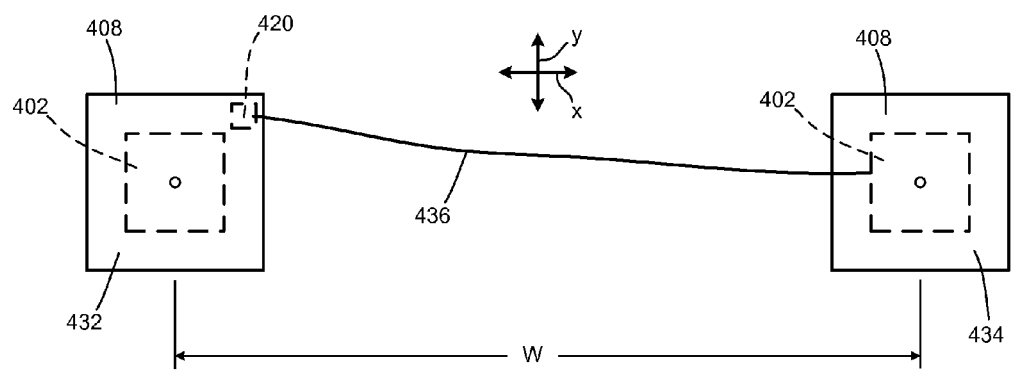
FIG. 4 is a top view of another three-dimensional optical position sensing system.

Referring next to FIG. 4, another three dimensional optical position sensing system 400 is illustrated. System 400 has a pair of sensors 432 and 434 similar to sensor 200 (FIG. 2). In this embodiment, sensors 432 and 434 share a common processor 420. Processor 420 is coupled to each the pixel-array detector in sensor. In this embodiment, processor 420, like the detector 402 of sensor 432 is mounted to the substrate 412 of sensor 402 and communicates with that detector through conductors in the mounting substrate. Processor 420 communicates with the detector of sensor 434 through wire 436. In other embodiments, processor 420 may communicate with sensor 434 through a wireless communication system.

Sensors 432 and 434 have independent mounting substrates (not shown in FIG. 4) and aperture plates 408, allowing them to be moved independently and space apart by a variable distance W. Alternatively, sensors 432 and 434 may be mounted to a common mounting substrate which would hold them in fixed relation to one another.

Referring briefly to FIG. 3, sensors 332 and 334 could alternatively be mounted to independent mounting substrates and have independent aperture plates, allowing them to be moved independently of one another. They could continue to share a processor which could be coupled to detectors in one or both of the sensor through by wires or wirelessly.

Figure 5:
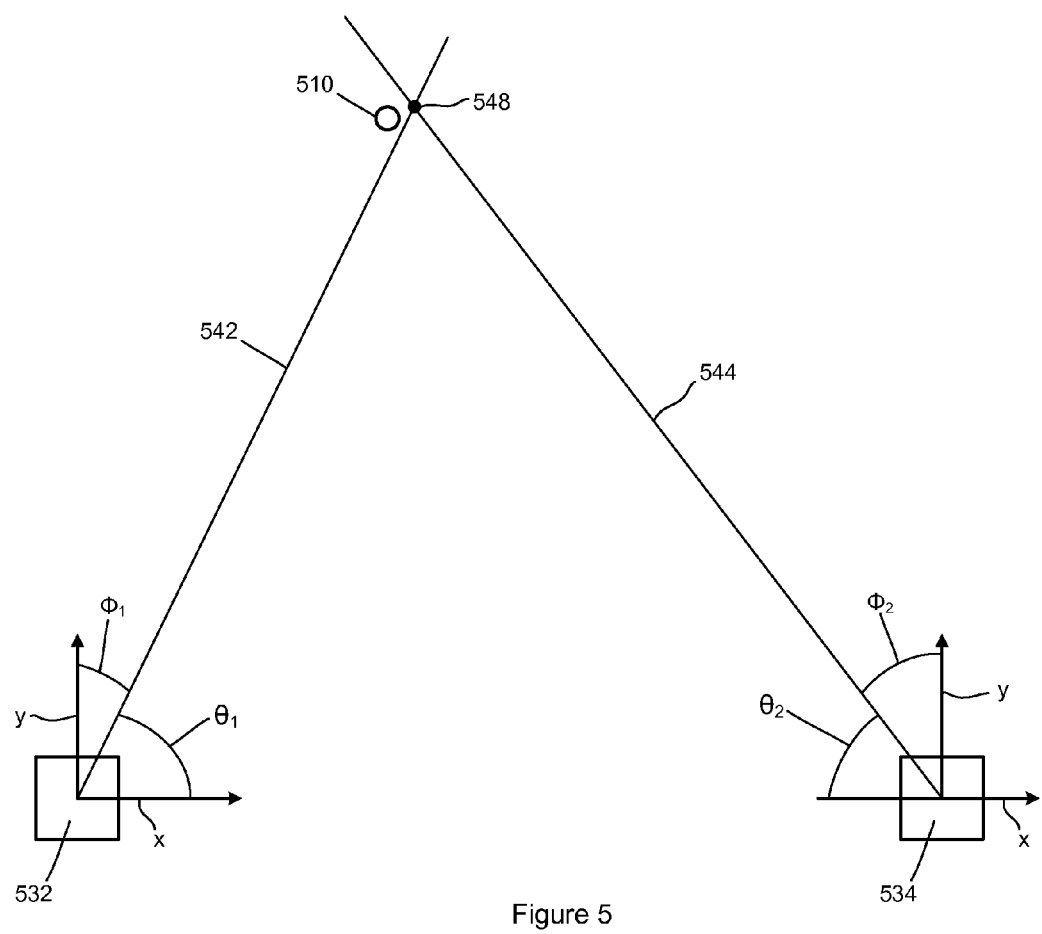
FIG. 5 illustrates the use of a three-dimensional optical position sensing system to estimate the position of a radiation source.

Reference is now made to FIG. 5, which illustrates the use of multiple sensors to estimate the position of a radiation source 510 in three dimensional space using a pair of sensors 532 and 534. Triangulating the position of an object in three-space requires at least two reference points A,B and two lines 542, 544, wherein reference points A, B define a third line segment. FIG. 5 is a top view of the arrangement of sensors 532, 534 and radiation source 510. Lines 542 and 544 extend through their respective sensors in three-dimensional space and are not necessarily co-planar.

Reference point A in FIG. 5. is the position of sensor 532. Reference point B is the position of sensor 534. Sensor 532 calculates a first incident angle pair $(\theta_1, \phi_1)$ that estimates the direction of radiation source 510 relative to sensor 532. Incident angle pair $(\theta_1, \phi_1)$ are illustrated at line 542. Similarly, sensor 534 calculates a second incident angle pair $(\theta_2, \phi_2)$ that corresponds to line 544 as an estimate of the direction of the radiation source relative to sensor 534. Sensors 532 and 534 share a processor that is adapted to find the intersection point 548 of lines 542 and 544, which is an estimate of the position of radiation source 510. Lines 542 and 544 are practically only estimates of the direction of radiation source relative to each sensor and accordingly will not intersect is some cases.

Figure 6:
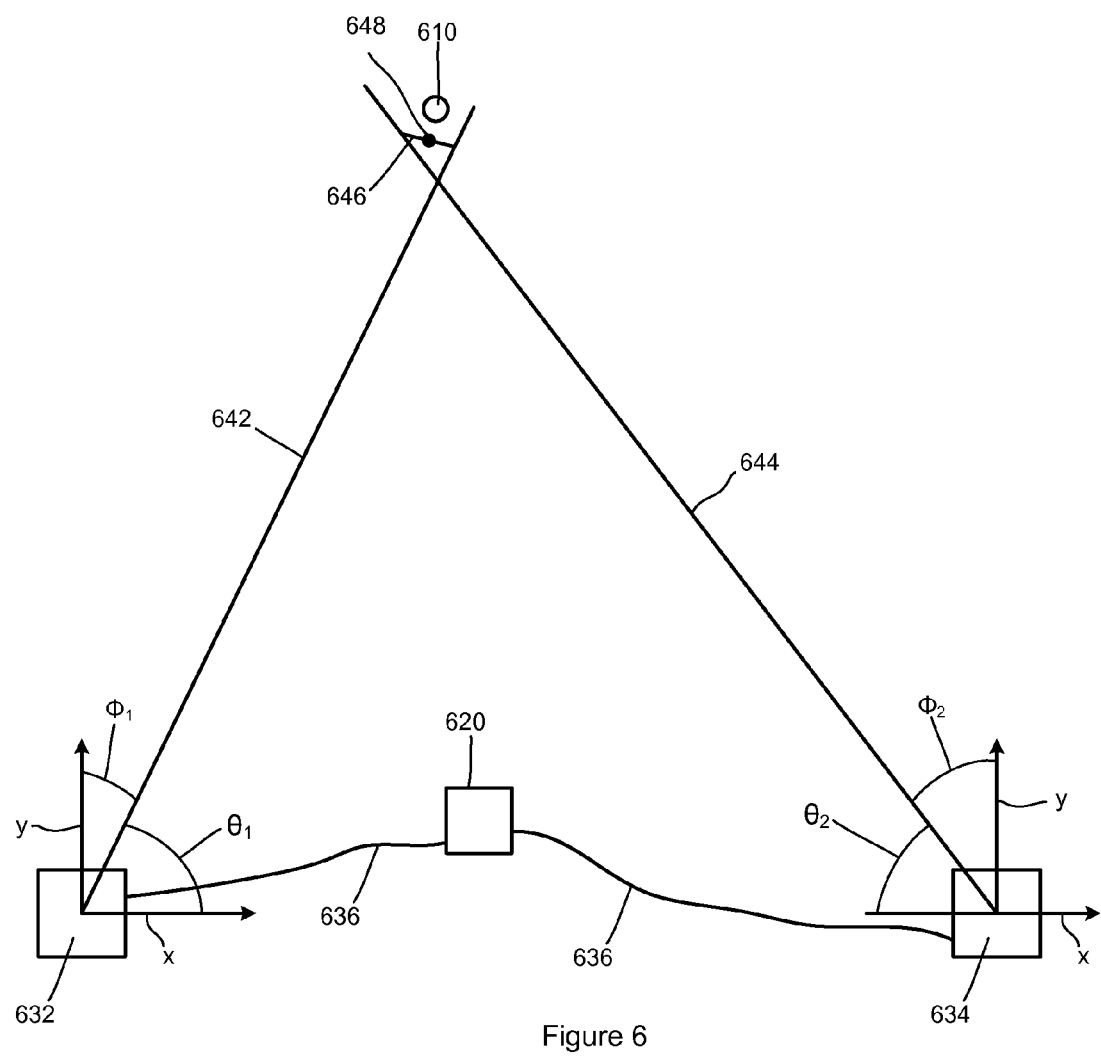
FIG. 6 is another illustration of a the use of a three-dimensional optical position sensing system to estimate the position of a radiation source.

Reference is next made to FIG. 6, in which a more practical approach to estimating the position is illustrated using a pair of sensors 632 and 634. Lines 642 and 644 are respectively estimates of the direction of radiation source 610 from each of the sensors 632 and 634. Processor 620 is coupled to each of the sensors to estimate lines 642 and 644 in the form of incident angle pairs that originate at the sensors 632 and 634. Lines 642 and 644 extend in three dimensional space. Using standard mathematical techniques a line segment 646 the terminates at the closest points on lines 642 and 644 may be calculated. Processor 620 is programmed to calculate this shortest line segment 646 between lines 642 and 644. Processor 620 then bisects the line segment 646 to calculate point 648, which is an estimate of the position of radiation source 610.

Figure 7:
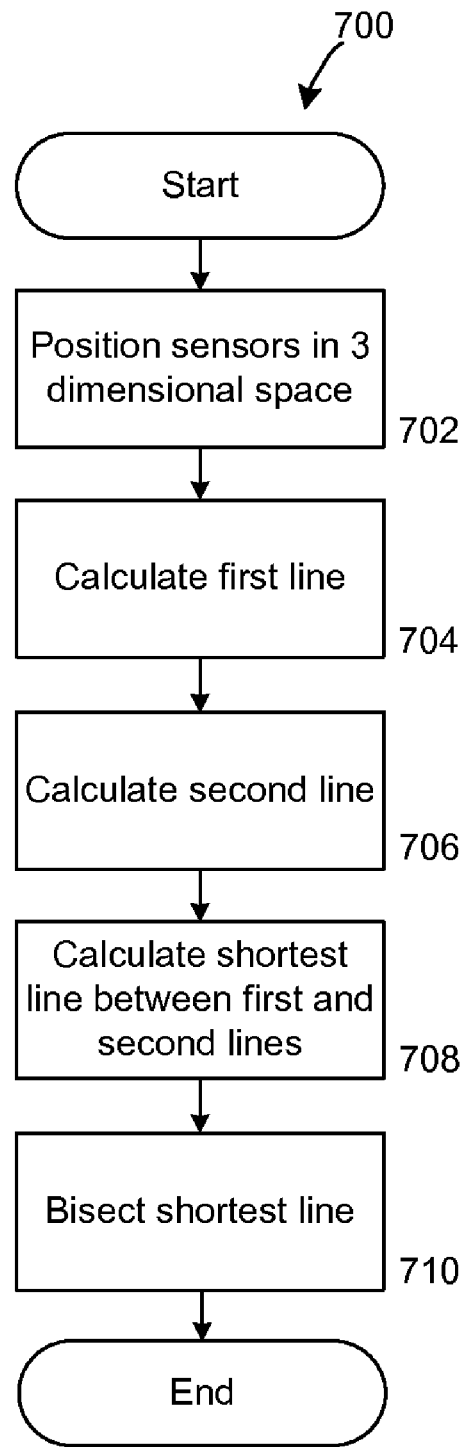
FIG. 7 is a flow chart of a method for estimating the position of an object in three space.

Reference is next made to FIG. 7, which illustrates a method 700 implemented in processor 620 to calculate point 648.

Method 700 begins in step 702, in which a pair of sensors are positioned in a three dimensional space. The pair of sensors may be any type of sensors that are capable of estimating a direction of radiation source relative to each of the sensors. For example, the two sensor may be sensors 332 and 334 (FIG. 3) or sensors 432 and 434 (FIG. 4) or sensors 532 and 534 (FIG. 5) or sensors 632 and 634 (FIG. 6). The remainder of this method will be explained as an example with reference to FIG. 6, although any suitable sensor may be used in the method. The sensors are positioned such that a radiation source (such as radiation source is within the field of view of each of the sensors and have a distance W between them.

Method 700 then proceeds to step 704, in which a first line is calculated in terms of a first reference point and a first incident angle pair $(\theta, \phi)$ defining an angular position in three-space. For example, the first line segment may be line 642, which has a reference point at the location of sensor 632 and extends in direction defined by first incident angle pair $(\theta_1, \phi_1)$.

Method 700 then proceeds to step 706 in which a second line is calculated in terms of a second reference point and a second incident angle pair $(\theta, \phi)$ is calculated. In this example, the second reference point is the position of sensor 634 and the second line is line 644, which extend from sensor 634 in a direction defined by second incident angle pair $(\theta_2, \phi_2)$.

Method 700 then proceeds to step 708 in which a line segment connecting the two closest points between the first and second line is calculated. In FIG. 6, the closest points on lines 642 and 644 are points 652 and 654. These point are identified as the endpoints of the shortest line segment 646 between lines 642 and 644. In the event that lines 642 and 644 intersect (i.e. the shortest line segment is of zero length), the point of intersection is deemed to be point 648 and the method ends.

If lines 642 and 644 do not intersect, method 700 proceeds to step 710 in which line segment 644 is bisected to find point 648 and the method ends.

Point 648 is an estimate of the position of the radiation source 610 in the three dimensions space in which the radiation sources are positioned.

Figure 8:
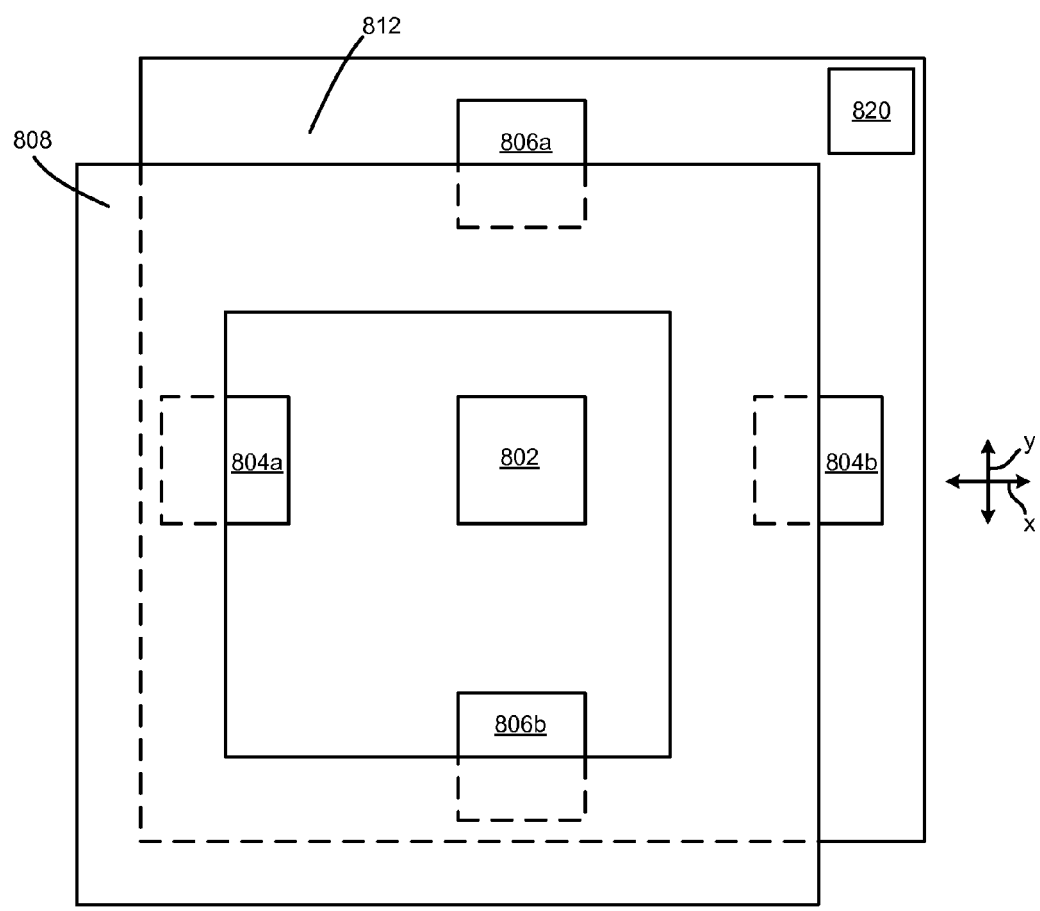
FIG. 8 is a top view of another sensor according to the invention.

Reference is next made to FIG. 8, which illustrates another example sensor 800 according to the present invention. Sensor 800 is similar in various aspects to sensor 100 and similar elements are identified with similar reference numerals.

Sensor 800 includes a reference radiation detector 802, a pair of first direction radiation detectors 804a and 804b, a pair of second direction radiation detectors 806a and 806b, an aperture plate 608, a mounting substrate 812 and a processor 820.

Mounting substrate is substantially parallel to an x-y plane. The reference detector 802, first direction detectors 804 and second direction detectors 806 are mounted to the mounting substrate. Aperture plate 808 is positioned between the detectors 802, 804, 806 and a radiation source 810 in a z-dimension, which is orthogonal to the x-y plane.

Aperture plate 808 has a square aperture 824 formed in it and detectors 802, 804a and 804c are positioned relative to the aperture 824 such that they are illuminated by a radiation source 810 in the same manner as a detectors 802, 804 and 806 of sensor 100 (FIG. 1). An edge 826 of the aperture 808 is aligned with the y direction centerline of detector 804b such that detectors 804a and 804b are typically illuminated in a similar way by radiation source 810. The distance between detectors 604a and 604b may result in radiation from radiation source 810 reaching detectors 804a and 804b at slightly different angles. Typically, the dimensions of sensor 800 will be significantly smaller than the distance between radiation source and the sensor 800 and this small difference can neglected. In some embodiments, this difference may be compensated for by processor 820.

Processor 820 is coupled to each of the detectors through conductors within the mounting substrate 812. Processor 820 receives a pair of radiation intensity signals $f_{1a}$ and $f_{1b}$ from detectors 804a and 804b. Processor 820 averages the two radiation intensity signals to calculate an average radiation intensity $f_1$, which is then used estimate an angle θ (not shown in FIG. 8) at which radiation from radiation source 810 strikes sensor 800 as described above in relation to sensor 100 (FIG. 1) relative to the x dimension.

Similarly, processor 820 receives a pair of radiation intensity signals $f_{2a}$ and $f_{2b}$ which are averaged and combined with a reference intensity signal $f_m$ from detector 802 to estimate an angle φ (not shown in FIG. 1) at which radiation from radiation source 810 strikes sensor 800 relative to the y-dimension.

The incident angle pair (θ, φ) collectively form an estimate of the angle radiation source 810 relative to the sensor 800.

In this example, first direction radiation detectors 804a and 804b are equally spaced from reference radiation detector 802 and similarly second direction radiation detectors 806a and 806b are equally spaced from reference radiation detector 802. In other embodiments, a pair of direction radiation detectors may be unequally spaced from the reference radiation detector. Optionally, in such embodiments, the processor may apply a differential weighting to the radiation intensity signals received from the two direction radiation detectors (instead of simply averaging the radiation intensity signals) to compensate for the different distances between the direction radiation detectors and that reference radiation detectors.

Figure 9:
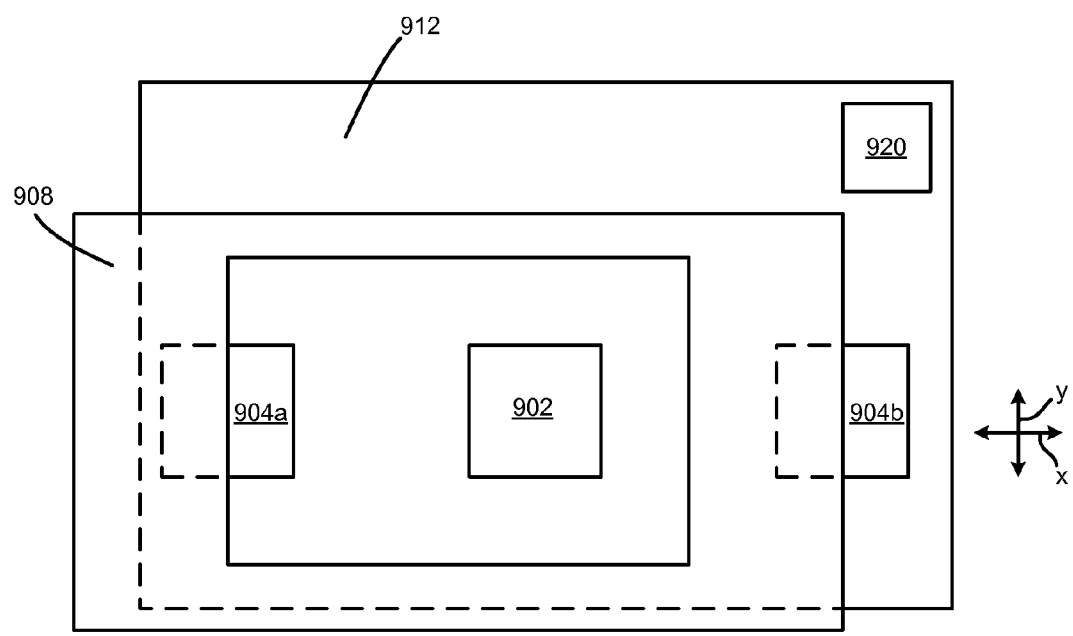
FIG. 9 is a top view of another sensor according to the invention.

Reference is next made to FIG. 9, which illustrates a single direction sensor 900 that is based on sensor 800. Corresponding components of the two sensors are identified with similar reference numerals. Sensor 900 has a reference radiation detector 902 and a single pair of direction radiation detectors 904a and 904b. Radiation detectors 904a and 904b operate in the same manner as radiation detectors 804a and 804b (FIG. 8) to provide a pair of radiation intensity signal f1a and f1b to processor 920. Processor 920 averages signal $f_{1a}$ and $f_{1b}$ and compares the average radiation intensity $f_1$ with a reference radiation intensity signal $f_m$ from detector 902 to provide a signal incident angle θ, which is an estimate of the direction of radiation source 910 relative to sensor 900 in one dimension. Sensor 900 may be used in embodiment in which it is desirable to estimate the position of the radiation source in one angular dimension.

Various examples of the present invention have been described. These examples do not limit the scope of the present invention.

The invention claimed is:

1. A sensor for estimating the angular direction of a radiation source relative to the sensor, the sensor comprising:
   a reference radiation detector for providing a reference radiation intensity signal corresponding to an intensity of radiation incident on the reference radiation detector;
   a first direction radiation detector for providing a first direction radiation intensity signal corresponding to an intensity of radiation incident on the first direction radiation detector;
   a second direction radiation detector for providing a second direction radiation intensity signal corresponding to an intensity of radiation incident on the second direction radiation detector;
   a radiation stop for partially blocking radiation from reaching the first and second direction radiation detectors; and
   a processor coupled to the reference radiation detector and to the first and second direction radiation detectors for providing first and second incident angles wherein the first incident angle corresponds to the first direction radiation intensity signal and the reference radiation intensity signal and the second incident angle corresponds to the second direction radiation intensity signal and the reference radiation intensity signal.

2. The sensor of claim 1 comprising:
   a pair of first direction radiation detectors for providing a pair of first direction radiation intensity signals corresponding respectively to an intensity of radiation incident on each of the first direction radiation detectors; and
   a pair of second direction radiation detectors for providing a pair of second direction radiation intensity signals corresponding respectively to an intensity of radiation incident on each of the second direction radiation detectors,
   wherein the first incident angle corresponds to the first direction radiation intensity signals and the reference radiation intensity signal and the second incident angle corresponds to the second direction radiation intensity signals and the reference radiation intensity signal.

3. A sensor for estimating the angular direction of a radiation source relative to the sensor, the sensor comprising:
   a reference radiation detector for providing a reference radiation intensity signal corresponding to an intensity of radiation incident on the reference radiation detector;
   a pair of directional radiation detectors for providing a pair of directional radiation intensity signal corresponding to an intensity of radiation incident on the first direction radiation detector;
   a radiation stop for partially blocking radiation from reaching the first and second direction radiation detectors; and a processor coupled to the reference radiation detector and to the directional radiation detectors for providing an incident angle, wherein the incident angle corresponds to the directional radiation intensity signals and the reference radiation intensity signal.

4. A sensor for estimating the angular direction of a radiation source relative to the sensor, the sensor comprising:
- a pixel array detector having an array of a pixels sensitive to radiation;
- an aperture plate having an aperture, wherein the aperture plate is arranged relative to the pixel array detector to partially blocking radiation from reaching the pixel array detector; and
- a processor coupled to the pixel array detector to receive radiation intensity information relating to the intensity of radiation incident on the pixels of the pixel array detector, wherein the processor is adapted to provide first and second incident angles, wherein the first incident angle is corresponds to the position of one or more pixels having a relatively high level of incident radiation in a first direction and the second incident angle corresponds to the position of one or more pixels have a relatively high level of incident radiation in a second direction.

5. A system for estimating the position of a radiation source in three dimensional space, the system comprising:
- a first radiation sensor for receiving radiation from the radiation source and for providing a first incident angle pair corresponding to the direction of the radiation source relative to the first radiation source;
- a second radiation sensor for receiving radiation from the radiation source and for providing a second incident angle pair corresponding the direction of the radiation source relative to the second radiation source; and
- a processor for calculating the estimated position of the radiation source based on the first and second incident angle pairs, wherein the processor is adapted to calculate the estimated position of the radiation source by determining a point of intersection between a first line defined by the first incident angle pair and the position of the first radiation sensor and a second line defined by the second incident angle pair and the second radiation sensor.

6. The system of claim 5 wherein the first and second sensors are mounted in a fixed relationship to one another.

7. The system of claim 5 wherein the first and second sensors may be independently positioned relative to one another.

8. A system for estimating the position of a radiation source in three dimensional space, the system comprising:
- a first radiation sensor for receiving radiation from the radiation source and for providing a first incident angle pair corresponding to the direction of the radiation source relative to the first radiation source;
- a second radiation sensor for receiving radiation from the radiation source and for providing a second incident angle pair corresponding the direction of the radiation source relative to the second radiation source; and
- a processor for calculating the estimated position of the radiation source based on the first and second incident angle pairs, wherein the processor is adapted to calculate the estimated position of the radiation source by identifying a line segment between the closest points between a first line defined by the first incident angle pair and the position of the first radiation sensor and a second line defined by the second incident angle pair and the second radiation sensor.

9. The system of claim 8 wherein the processor is adapted to calculate the estimate position of the radiation source by bisecting the line segment.

10. The system of claim 8 wherein the first and second sensors are mounted in a fixed relationship to one another.

11. The system of claim 8 wherein the first and second sensors may be independently positioned relative to one another.

12. A method of estimating the position of a radiation source, comprising:
- positioning first and second sensors in a three dimensional space, wherein the first second sensor are separated by a sensor spacing distance;
- calculating a first line corresponding to the position of the first sensor and the position of the radiation source;
- calculating a second line corresponding to the position of the second sensor and the position of the radiation source; and
- calculating an estimated position of the radiation source based on the first and second lines, wherein the position of the radiation source is estimated by identifying a point of intersection between the first and second lines.

13. A method of estimating the position of a radiation source, comprising:
- positioning first and second sensors in a three dimensional space, wherein the first second sensor are separated by a sensor spacing distance;
- calculating a first line corresponding to the position of the first sensor and the position of the radiation source;
- calculating a second line corresponding to the position of the second sensor and the position of the radiation source; and
- calculating an estimated position of the radiation source based on the first and second lines, wherein the position of the radiation source is estimated by identifying a line segment between the closest points on the first and second lines.

14. The method of claim 13 wherein the position of the radiation source is estimated by bisecting the line segment.

* * * * *